United States Patent
Wang

(10) Patent No.: US 10,764,575 B2
(45) Date of Patent: Sep. 1, 2020

(54) CODING MCTS-NESTED SEI MESSAGES TO EXCLUDE OTHER SEI MESSAGES THAT ARE NOT MCTS-NESTED

(71) Applicant: QUALCOMM Incorporated, San Diego, CA (US)

(72) Inventor: Ye-Kui Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/909,597

(22) Filed: Mar. 1, 2018

(65) Prior Publication Data

US 2018/0255323 A1    Sep. 6, 2018

Related U.S. Application Data

(60) Provisional application No. 62/473,947, filed on Mar. 20, 2017, provisional application No. 62/466,871, filed on Mar. 3, 2017.

(51) Int. Cl.
*H04N 19/105* (2014.01)
*H04N 19/70* (2014.01)
(Continued)

(52) U.S. Cl.
CPC ......... *H04N 19/105* (2014.11); *H04N 19/137* (2014.11); *H04N 19/174* (2014.11);
(Continued)

(58) Field of Classification Search
CPC .... H04N 19/105; H04N 19/188; H04N 19/46; H04N 19/55; H04N 19/70
See application file for complete search history.

(56) References Cited

U.S. PATENT DOCUMENTS 9,992,501 B2   6/2018  Lee et al.
10,250,897 B2  4/2019  Deshpande et al.
(Continued)

FOREIGN PATENT DOCUMENTS

WO    2017137444 A1    8/2017

OTHER PUBLICATIONS

Skupin, "Motion-Constrained Tile Sets Extraction Information SEI Messages Draft 1", Joint Collaborative Team on Video Coding (JCT-VC) of ITU-T SG 16 WP 3 and ISO/IEC JTC 1/SC 29/WG 11, JCTVC-Y1008, Oct. 14-21, 2016, p. 1-6. (Year: 2016).*

(Continued)

*Primary Examiner* — Jamie J Atala
*Assistant Examiner* — Michael Robert Cammarata
(74) *Attorney, Agent, or Firm* — Shumaker & Sieffert, P.A.

(57) ABSTRACT

An example device for processing video data includes a memory configured to store video data; and one or more processors implemented in circuitry and configured to decode a supplemental enhancement information (SEI) network abstraction layer (NAL) unit of a video bitstream including the video data, the SEI NAL unit containing a motion constrained tile sets (MCTS) nesting SEI message; determine that the SEI NAL unit does not contain any non-MCTS-nesting SEI messages in response to the SEI NAL unit containing the MCTS nesting SEI message; and decode subsequent SEI messages of the SEI NAL unit as MCTS nesting SEI messages in response to the determination.

42 Claims, 5 Drawing Sheets

(51) Int. Cl.
  *H04N 19/46* (2014.01)
  *H04N 19/55* (2014.01)
  *H04N 19/169* (2014.01)
  *H04N 19/184* (2014.01)
  *H04N 19/174* (2014.01)
  *H04N 19/137* (2014.01)
  *H04N 19/176* (2014.01)
  *H04N 19/587* (2014.01)
  *H04N 19/31* (2014.01)

(52) U.S. Cl.
  CPC ......... *H04N 19/176* (2014.11); *H04N 19/184* (2014.11); *H04N 19/188* (2014.11); *H04N 19/46* (2014.11); *H04N 19/55* (2014.11); *H04N 19/587* (2014.11); *H04N 19/70* (2014.11); *H04N 19/31* (2014.11)

(56) References Cited

U.S. PATENT DOCUMENTS

| | | | |
|---|---|---|---|
| 10,356,459 B2* | 7/2019 | Hirabayashi | |
| 2014/0301464 A1 | 10/2014 | Wu et al. | |
| 2015/0016504 A1 | 1/2015 | Auyeung et al. | |
| 2015/0016547 A1* | 1/2015 | Tabatabai | H04N 19/423 375/240.26 |
| 2015/0103886 A1* | 4/2015 | He | H04N 19/188 375/240.02 |
| 2015/0103888 A1* | 4/2015 | Chen | H04N 21/4343 375/240.02 |
| 2015/0195571 A1 | 7/2015 | Boyce et al. | |
| 2015/0271529 A1* | 9/2015 | Wang | H04N 19/89 375/240.26 |
| 2016/0156917 A1* | 6/2016 | Ugur | H04N 19/167 375/240.08 |
| 2016/0255373 A1* | 9/2016 | Deshpande | H04N 19/70 375/240.25 |
| 2016/0381393 A1 | 12/2016 | Tsukuba et al. | |
| 2017/0118466 A1 | 4/2017 | Nakagami | |
| 2017/0150160 A1* | 5/2017 | Deshpande | H04N 19/30 |
| 2018/0176603 A1 | 6/2018 | Fujimoto | |
| 2018/0255296 A1 | 9/2018 | Wang | |
| 2018/0255305 A1 | 9/2018 | Wang | |
| 2018/0255322 A1 | 9/2018 | Wang | |
| 2019/0014337 A1* | 1/2019 | Skupin | H04N 19/34 |
| 2019/0058895 A1* | 2/2019 | Deshpande | H04N 19/30 |
| 2019/0098348 A1* | 3/2019 | Gruneberg | H04N 21/4345 |
| 2019/0342581 A1* | 11/2019 | Deshpande | H04N 19/174 |

OTHER PUBLICATIONS

International Search Report and Written Opinion—PCT/US2018/020677—ISA/EPO—dated Sep. 3, 2018.

Joshi R., et al., "HEVC Screen Content Coding Draft Text 6," 23. JCT-VC Meeting; Feb. 19, 2016-Feb. 26, 2016; San Diego; (Joint Collaborative Team on Video Coding of ISO/IEC JTC1/SC29/WG11 and ITU-T SG.16); URL: http://wftp3.itu.int/av-arch/jctvc-site/,, No. JCTVC-W1005, Mar. 24, 2016, XP030117928, pp. 1-658.

Partial International Search Report—PCT/US2018/020677—ISA/EPO—dated Jun. 6, 2018.

Sullivan G.J., et al., "Meeting Report of the 27th JCT-VC Meeting," Mar. 31, 2017-Apr. 7, 2017; Hobart; (Joint Collaborative Team on Video Coding of ISO/IEC JTC1/SC29/WG11 and ITU-TSG.16); URL: http://wftp3.itu.int/av-arch/jctvc-site/,, No. JCTVC-AA1000, Jul. 14, 2017, 61 pages, XP030118224.

Wang Y-K., (Qualcomm): "On the MCTS Related SEI Messages", 27. JCT-VC Meeting; Mar. 31, 2017-Apr. 7, 2017; Hobart; (Joint Collaborative Team on Video Coding of ISO/IEC JTC1/SC29/WG11 and ITU-T SG.16); URL: http://wftp3.1tu.int/av-arch/jctvc-site/, No. JCTVC-AA0024, Mar. 21, 2017 (Mar. 21, 2017), XP030118189, pp. 1-4.

Wang Y-K (Qualcomm): "On the MCTS Related SEI Messages (JCTVC-AA0024)—HEVC Additional Supplemental Enhancement Information (Draft 1)", Mar. 21, 2017 (Mar. 21, 2017), XP055474795, 4 Pages, Retrieved from the Internet: URL: http://phenix.int-evry.fr/jct/doc_end_user/documents/27_Hobart/ wg11 /JCTVC-AA0024-v1.zip [retrieved on May 14, 2018].

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Boyce, et al., "HEVC Additional Supplemental Enhancement Information (Draft 1)," Joint Collaborative Team on Video Coding (JCT-VC) of ITU-T SG 16 WP 3 and ISO/IEC JTC 1/SC 29/WG 11, 26th Meeting: Geneva, Jan. 12-20, 2017, document: JCTVC-Z1005, 19 pp.

U.S. Appl. No. 15/909,395, filed by Ye-Kui Wang, et al., filed Mar. 1, 2018.

U.S. Appl. No. 15/909,418, filed by Ye-Kui Wang, et al., filed Mar. 1, 2018.

U.S. Appl. No. 15/909,460, filed by Ye-Kui Wang, et al., filed Mar. 1, 2018.

* cited by examiner

CODING MCTS-NESTED SEI MESSAGES TO EXCLUDE OTHER SEI MESSAGES THAT ARE NOT MCTS-NESTED

This application claims the benefit of U.S. Provisional Application 62/466,871, filed Mar. 3, 2017, and U.S. Provisional Application No. 62/473,947, filed Mar. 20, 2017, the entire content of each of which is hereby incorporated by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes video coding techniques using enhanced designs for motion-constrained tile sets (MCTSs) that enable clean extraction of a conforming bitstream that includes a subset of the MCTSs contained in an original video bitstream. In general, the techniques of this disclosure are described in the context of High Efficiency Video Coding (HEVC). However, these techniques may be applied generally to any video codec that enables extractable independently coded regions.

In one example, a method of processing video data includes determining whether an access unit of the video data includes a temporal motion constrained tile sets (MCTS) supplemental enhancement information (SEI) message; and decoding an MCTS extraction information set (MCTS-EIS) SEI message of the access unit only when the access unit includes the temporal MCTS SEI message.

In another example, a device for processing video data includes a memory configured to store video data; and one or more processors implemented in circuitry and configured to determine whether an access unit of the video data includes a temporal motion constrained tile sets (MCTS) supplemental enhancement information (SEI) message; and decode an MCTS extraction information set (MCTS-EIS) SEI message of the access unit only when the access unit includes the temporal MCTS SEI message.

In another example, a device for processing video data includes means for determining whether an access unit of the video data includes a temporal motion constrained tile sets (MCTS) supplemental enhancement information (SEI) message; and means for decoding an MCTS extraction information set (MCTS-EIS) SEI message of the access unit only when the access unit includes the temporal MCTS SEI message.

In another example, a computer-readable storage medium has stored thereon instructions that, when executed, cause a processor to determine whether an access unit of the video data includes a temporal motion constrained tile sets (MCTS) supplemental enhancement information (SEI) message; and decode an MCTS extraction information set (MCTS-EIS) SEI message of the access unit only when the access unit includes the temporal MCTS SEI message.

In another example, a method of processing video data includes determining a value of a syntax element of a temporal motion constrained tile sets (MCTS) supplemental enhancement information (SEI) message of an access unit, wherein the value of the syntax element represents whether all tiles of one or more corresponding pictures are included in separate MCTSs; and when the value of the syntax element indicates that the tiles of the corresponding pictures are not included in the separate MCTSs, setting an MCTS identifier of the MCTS of a current picture of the access unit equal to a value of an index of the MCTS, the current picture being one of the corresponding pictures.

In another example, a device for processing video data includes a memory configured to store video data; and one or more processors implemented in circuitry and configured to determine a value of a syntax element of a temporal motion constrained tile sets (MCTS) supplemental enhancement information (SEI) message of an access unit, wherein the value of the syntax element represents whether all tiles of one or more corresponding pictures are included in separate MCTSs; and when the value of the syntax element indicates that the tiles of the corresponding pictures are not included in the separate MCTSs, set an MCTS identifier of the MCTS of a current picture of the access unit equal to a value of an index of the MCTS, the current picture being one of the corresponding pictures.

In another example, a device for processing video data includes means for determining a value of a syntax element of a temporal motion constrained tile sets (MCTS) supplemental enhancement information (SEI) message of an access unit, wherein the value of the syntax element represents whether all tiles of one or more corresponding pictures are included in separate MCTSs; and means for setting an MCTS identifier of the MCTS of a current picture of the access unit equal to a value of an index of the MCTS when the value of the syntax element indicates that the tiles of the corresponding pictures are not included in the separate MCTSs, the current picture being one of the corresponding pictures.

In another example, a computer-readable storage medium has stored thereon instructions that, when executed, cause a processor to determine a value of a syntax element of a temporal motion constrained tile sets (MCTS) supplemental enhancement information (SEI) message of an access unit, wherein the value of the syntax element represents whether all tiles of one or more corresponding pictures are included in separate MCTSs; and when the value of the syntax element indicates that the tiles of the corresponding pictures are not included in the separate MCTSs, set an MCTS identifier of the MCTS of a current picture of the access unit equal to a value of an index of the MCTS, the current picture being one of the corresponding pictures.

In another example, a method of processing video data includes determining to extract a motion constrained tile sets (MCTS) sub-bitstream from an original bitstream based at least in part on information of an MCTS extraction information set (MCTS-EIS) supplemental enhancement information (SEI) message; and in response to determining to extract the MCTS sub-bitstream, omitting all SEI network abstraction layer (NAL) units that contain non-MCTS-nested SEI messages from inclusion in the extracted MCTS sub-bitstream, regardless of a value of a NAL unit header layer identifier value for the non-MCTS-nested SEI messages.

In another example, a device for processing video data includes a memory configured to store video data; and one or more processors implemented in circuitry and configured to determine to extract a motion constrained tile sets (MCTS) sub-bitstream from an original bitstream including the video data based at least in part on information of an MCTS extraction information set (MCTS-EIS) supplemental enhancement information (SEI) message; and in response to determining to extract the MCTS sub-bitstream, omit all SEI network abstraction layer (NAL) units that contain non-MCTS-nested SEI messages from inclusion in the extracted MCTS sub-bitstream, regardless of a value of a NAL unit header layer identifier value for the non-MCTS-nested SEI messages.

In another example, a device for processing video data includes means for determining to extract a motion constrained tile sets (MCTS) sub-bitstream from an original bitstream based at least in part on information of an MCTS extraction information set (MCTS-EIS) supplemental enhancement information (SEI) message; and means for omitting all SEI network abstraction layer (NAL) units that contain non-MCTS-nested SEI messages from inclusion in the extracted MCTS sub-bitstream in response to determining to extract the MCTS sub-bitstream, regardless of a value of NAL unit header layer identifier value for the non-MCTS-nested SEI messages.

In another example, a computer-readable storage medium has stored thereon instructions that, when executed, cause a processor to determine to extract a motion constrained tile sets (MCTS) sub-bitstream from an original bitstream based at least in part on information of an MCTS extraction information set (MCTS-EIS) supplemental enhancement information (SEI) message; and in response to determining to extract the MCTS sub-bitstream, omit all SEI network abstraction layer (NAL) units that contain non-MCTS-nested SEI messages from inclusion in the extracted MCTS sub-bitstream, regardless of a value of a NAL unit header layer identifier value for the non-MCTS-nested SEI messages.

In another example, a method of processing video data includes decoding a supplemental enhancement information (SEI) network abstraction layer (NAL) unit of a video bitstream, the SEI NAL unit containing a motion constrained tile sets (MCTS) nesting SEI message; determining that the SEI NAL unit does not contain any non-MCTS-nesting SEI messages in response to the SEI NAL unit containing the MCTS nesting SEI message; and decoding subsequent SEI messages of the SEI NAL unit as MCTS nesting SEI messages in response to the determination.

In another example, a device for processing video data includes a memory configured to store video data; and one or more processors implemented in circuitry and configured to decode a supplemental enhancement information (SEI) network abstraction layer (NAL) unit of a video bitstream including the video data, the SEI NAL unit containing a motion constrained tile sets (MCTS) nesting SEI message; determine that the SEI NAL unit does not contain any non-MCTS-nesting SEI messages in response to the SEI NAL unit containing the MCTS nesting SEI message; and decode subsequent SEI messages of the SEI NAL unit as MCTS nesting SEI messages in response to the determination.

In another example, a device for processing video data includes means for decoding a supplemental enhancement information (SEI) network abstraction layer (NAL) unit of a video bitstream, the SEI NAL unit containing a motion constrained tile sets (MCTS) nesting SEI message; means for determining that the SEI NAL unit does not contain any non-MCTS-nesting SEI messages in response to the SEI NAL unit containing the MCTS nesting SEI message; and means for decoding subsequent SEI messages of the SEI NAL unit as MCTS nesting SEI messages in response to the determination.

In another example, a computer-readable storage medium has stored thereon instructions that, when executed, cause a processor to decode a supplemental enhancement information (SEI) network abstraction layer (NAL) unit of a video bitstream, the SEI NAL unit containing a motion constrained tile sets (MCTS) nesting SEI message; determine that the SEI NAL unit does not contain any non-MCTS-nesting SEI messages in response to the SEI NAL unit containing the MCTS nesting SEI message; and decode subsequent SEI messages of the SEI NAL unit as MCTS nesting SEI messages in response to the determination.

The details of one or more examples are set forth in the accompanying drawings and the description below. Other features, objects, and advantages will be apparent from the description and drawings, and from the claims.

DETAILED DESCRIPTION

Figure 1:
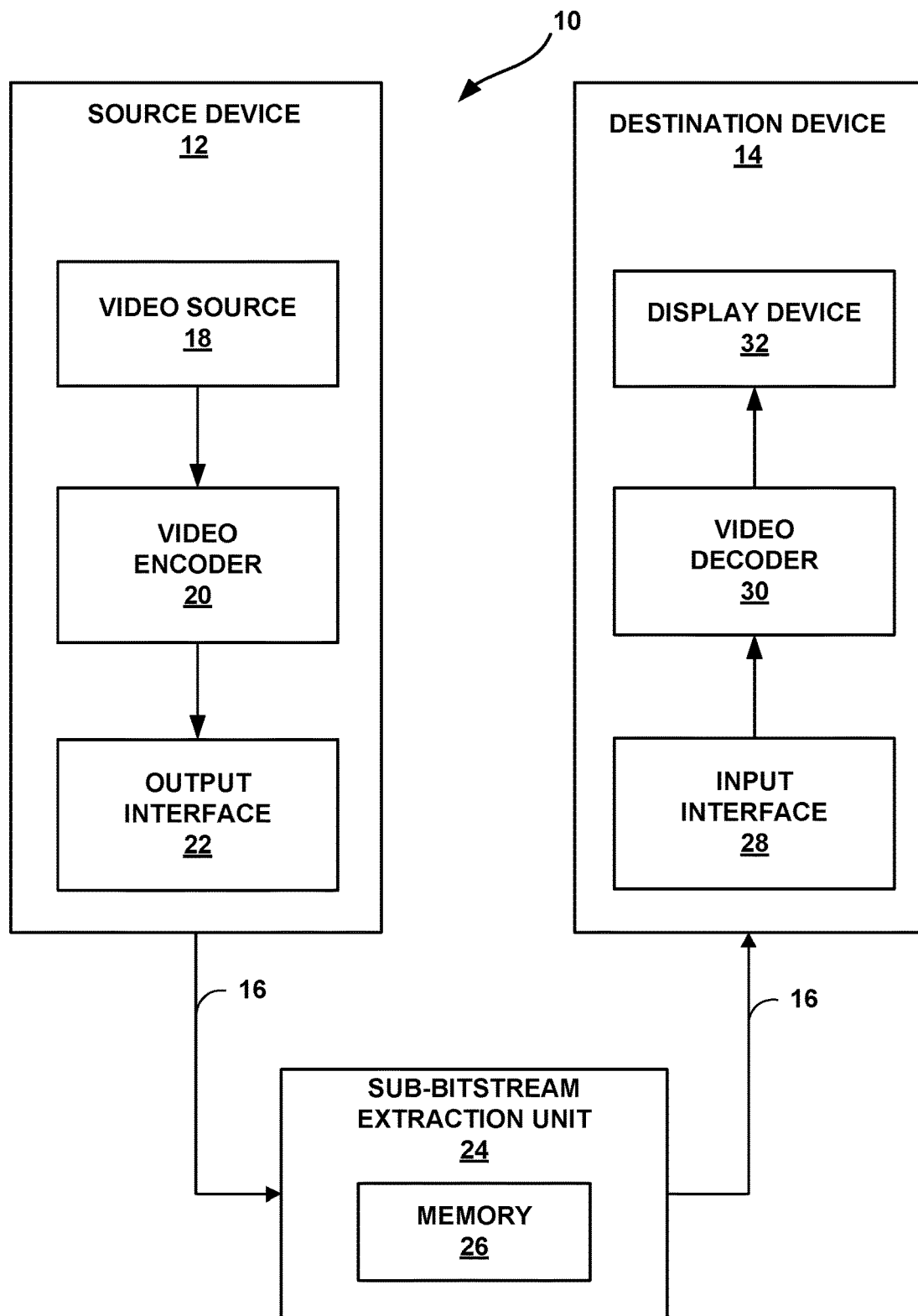
FIG. 1 is a block diagram illustrating an example video encoding and decoding system that may utilize techniques for processing video data using motion-constrained tile sets (MCTSs).

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions, and ITU-T H.265 (also known as ISO/IEC MPEG-4 High Efficiency Video Coding (HEVC)), including its scalable and multiview extensions SHVC and MV-HEVC, respectively.

HEVC supports coding of extractable, independently coded regions using motion-constrained tile sets (MCTSs), and signalling of MCTSs using a temporal MCTSs supplemental enhancement information (SEI) message and inter-layer constrained tile sets SEI message.

The temporal MCTSs SEI message indicates that the inter prediction process is constrained such that no sample value outside each identified tile set, and no sample value at a fractional sample position that is derived using one or more sample values outside the identified tile set is used for inter prediction of any sample within the identified tile set. Some information of the indicated MCTSs, such as the tier and level, are also signalled in the temporal MCTSs SEI message, according to HEVC.

Two MCTS related SEI messages are currently being developed by the JCT-VC. A draft specification that includes the designs is in included in document JCTVC-Z1005, available from phenix.int-evry.fr/jct/doc_end_user/documents/26_Geneva/wg11/JCTVC-Z1005-v1.zip. In JCTVC-Z1005, these two SEI messages are named MCTSs extraction information set (MCTS-EIS) SEI message and MCTSs extraction information nesting (MCTS-EIN) SEI message, respectively. Table 1 below provides the syntax for the MCTS SEI message according to HEVC. Table 2 below provides the syntax for the MCTS-EIS SEI message of JCTVC-Z1005. Table 3 below provides the syntax for the MCTS-EIN SEI message of JCTVC-Z1005.

TABLE 1

| | Descriptor |
|---|---|
| temporal_motion_constrained_tile_sets ( payloadSize ) { | |
|   mc_all_tiles_exact_sample_value_match_flag | u(1) |
|   each_tile_one_tile_set_flag | u(1) |
|   if( !each_tile_one_tile_set_flag ) { | |
|     limited_tile_set_display_flag | u(1) |
|     num_sets_in_message_minus1 | ue(v) |
|     for( i = 0; i <= num_sets_in_message_minus1; i++ ) { | |
|       mcts_id[ i ] | ue(v) |
|       if( limited_tile_set_display_flag ) | |
|         display_tile_set_flag [ i ] | u(1) |
|       num_tile_rects_in_set_minus1[ i ] | ue(v) |
|       for( j = 0; j <= num_tile_rects_in_set_minus1[ i ]; j++ ) { | |
|         top_left_tile_index[ i ][ j ] | ue(v) |
|         bottom_right_tile_index[ i ][ j ] | ue(v) |
|       } | |
|       if( !mc_all_tiles_exact_sample_value_match_flag ) | |
|         mc_exact_sample_value_match_flag[ i ] | u(1) |
|       mcts_tier_level_idc_present_flag[ i ] | u(1) |
|       if( mcts_tier_level_idc_present_flag[ i ] ) { | |
|         mcts_tier_flag[ i ] | u(1) |
|         mcts_level_idc[ i ] | u(8) |
|       } | |
|     } | |
|   } else { | |
|     max_mcs_tier_level_idc_present_flag | u(1) |
|     if( mcts_max_tier_level_idc_present_flag) { | |
|       mcts_max_tier_flag | u(1) |
|       mcts_max_level_idc | u(8) |
|     } | |
|   } | |
| } | |

TABLE 2

| | Descriptor |
|---|---|
| mcts_extraction_info_set( ) { | |
|   num_extraction_info_sets_minus1 | ue(v) |
|   for( i = 0; i <= num_extraction_information_sets_minus1; i++ ) { | |
|     num_associated_tile_set_identifiers_minus1[ i ] | ue(v) |
|     for( j = 0; j <= num_associated_tile_set_identifiers_minus1[ i ]; j++ ) | |
|       mcts_identifier[ i ][ j ] | ue(v) |
|     num_vps_in_extraction_info_set_minus1[ i ] | ue(v) |
|     for( j = 0; j <= num_vps_in_extraction_set_minus1[ i ]; j++ ) | |
|       vps_rbsp_data_length[ i ][ j ] | ue(v) |
|     num_sps_in_extraction_info_set_minus1[ i ] | ue(v) |
|     for( j = 0; j <= num_sps_in_extraction_set_minus1[ i ]; j++ ) | |
|       sps_rbsp_data_length[ i ][ j ] | ue(v) |
|     num_pps_in_extraction_info_set_minus1[ i ] | ue(v) |
|     for( j = 0; j <= num_pps_in_extraction_set_minus1[ i ]; j++ ) { | |
|       pps_nuh_temporal_id_plus1[ i ][ j ] | u(3) |
|       pps_rbsp_data_length[ i ][ j ] | ue(v) |
|     } | |
|     while( !byte_aligned() ) | |
|       mcts_alignment_bit_equal_to_zero | f(1) |
|     for( j = 0; j <= num_vps_in_extraction_set_minus1[ i ]; j++ ) | |
|       for( k = 0; k <= vps_rbsp_data_length[ i ][ j ]; k++ ) | |
|         vps_rbsp_data_bytes[ i ][ j ][ k ] | u(8) |
|     for( j = 0; j <= num_sps_in_extraction_set_minus1[ i ]; j++ ) | |
|       for( k = 0; k <= sps_rbsp_data_length[ i ][ j ]; k++ ) | |
|         sps_rbsp_data_bytes[ i ][ j ][ k ] | u(8) |

TABLE 2-continued

```
      for( j = 0; j <= num_pps_in_extraction_set_minus1[ i ]; j++ )
      for( k = 0; k <= pps_rbsp_data_length[ i ][ j ]; k++ )
         pps_rbsp_data_bytes[ i ][ j ][ k ]                                u(8)
      }
   }
```

TABLE 3

| | Descriptor |
|---|---|
| mcts_extraction_info_nesting( ) { | |
|   all_tile_sets_flag | u(1) |
|   if( !all_tile_sets_flag ) { | |
|     num_associated_mcts_identifiers_minus1 | ue(v) |
|     for( i = 0; i <= num_associated_mets_identifiers_minus1; i++ ) | |
|       mcts_identifier[ i ] | ue(v) |
|   } | |
|   num_sei_messages_in_mcts_extraction_nesting_minus1 | ue(v) |
|   while( !byte_aligned( ) ) | |
|     mcts_nesting_zero_bit /* equal to 0 */ | u(1) |
|   for( i = 0; i <= num_sei_messages_in_mcts_extraction_nesting_minus1; i++ ) | |
|     sei_message( ) | |
| } | |

The MCTS-EIS SEI message of JCTVC-Z1005 provides supplemental information that can be used in extraction of a sub-bitstream for an MCTS. The information includes a number of extraction information sets, each containing identifiers of the MCTSs to which the extraction information set applies. Each extraction information set contains RBSP bytes of replacement video parameter sets, sequence parameter sets, and picture parameter sets to be used during the MCTS sub-bitstream extraction process.

The MCTS-EIS SEI message of JCTVC-Z1005, which may be referred to as a "MCTS nesting SEI message" for simplicity, provides a mechanism to convey and associate SEI messages with bitstream subsets corresponding to one or MCTSs. An SEI message contained in an MCTS nesting SEI message is referred to as MCTS-nested or an MCTS-nested SEI message, and an SEI message that is not contained in an MCTS nesting SEI message is referred to as non-MCTS-nested or a non-MCTS-nested SEI message. When a sub-bitstream is extracted for an MCTS, the MCTS-nested SEI messages applicable to an MCTS in an access unit can be included in the corresponding access unit of the extracted sub-bitstream as non-MCTS-nested SEI messages.

Use of the designs of the temporal MCTSs SEI message in the current HEVC specification as well as the two MCTS related SEI messages in JCTVC-Z1005 may encounter the following issues:

1) To be meaningful, an MCTS-EIS SEI message has to depend on a temporal MCTSs SEI message, which is referred to as the associated temporal MCTSs SEI message. However, the presence of an MCTS-EIS SEI message in an access unit is not conditioned on the presence of a temporal MCTSs SEI message. This makes the semantics of the MCTS-EIS SEI message unnecessarily complicated, particular with the need of specifying its own set of associated/applicable pictures and the need of specifying a few complicated bitstream constraints on this SEI message itself and on the temporal MCTSs SEI message. These would make generation of bitstreams more complicated and incur higher costs in conformance testing.

2) For both of the two MCTS related SEI messages in JCTVC-Z1005, MCTS identifiers represented by instances of the mcts_id[i] syntax element of the associated temporal MCTSs SEI message are used in the semantics. However, the following issues exists here:
   a. The current semantics of the temporal MCTSs SEI message specify that mcts_id[i] contains an identifying number that may be used to identify the purpose of the i-th identified tile set. In other words, mcts_id[i] is not the MCTS identifier, but the purpose, and different MCTSs can have the same value of mcts_id[i] (for the same purpose). Furthermore, values for mcts_id[i] are currently either reserved for future use by ITU-T|ISO/IEC or specified as "may be determined by the application" and decoders encountering temporal MCTSs SEI messages with mcts_id[i] having values of the first category shall ignore the SEI messages (and in this case these two MCTS related SEI messages would also become useless as they depend on temporal MCTSs SEI messages), while values for mcts_id[i] of the second category would be meaningless for any application unless that application specifies the values.
   b. When each_tile_one_tile_set_flag of the associated temporal MCTSs SEI message is equal to 1, there is no mcts_id[i] present or inferred. Consequently, this scenario, which is common, is not supported.

3) There is a step in the MCTS sub-bitstream extraction process specified in the semantics of the MCTS-EIS SEI message to remove all SEI NAL units that have nuh_layer_id equal to 0 and that contain non-MCTS-nested SEI messages. However, having the condition "that have nuh_layer_id equal to 0" would keep all SEI NAL units with nuh_layer_id greater than 0 in the extracted bitstream, while non-MCTS-nested SEI messages in SEI NAL units with nuh_layer_id greater than 0, if present, would not apply to an extracted subset of MCTSs, and thus should not be included in the extracted sub-bitstream.

4) The final step of the MCTS sub-bitstream extraction process specified in the semantics of the MCTS-EIS SEI message is to adjust the slice segment header of each VCL NAL unit, including setting the values of the slice segment header syntax elements first_slice_segment_in_pic_flag and slice_segment_address. However, when there is slice segment header dependency of a dependent slice segment of the target MCTS on an independent slice segment of another MCTS, this sub-bitstream extraction process won't generate a conforming bitstream, because a lot of the slice segment syntax elements are not available for that dependent slice segment header.

5) To be meaningful, an MCTS nesting SEI message has to depend on a temporal MCTSs SEI message as well as on an MCTS-EIS SEI message. However, the presence of an MCTS nesting SEI message in an access unit is not conditioned on the presence of a temporal MCTSs SEI message or an MCTS-EIS SEI message.

6) An SEI NAL unit containing an MCTS nesting SEI message may contain non-MCTS-nested SEI messages. However, this unnecessarily complicates the extraction of a conforming bitstream for an MCTS that contain SEI messages, and actually, one step of the MCTS sub-bitstream extraction process as specified in the semantics of the MCTS-EIS SEI message would remove such SEI NAL units.

7) An MCTS containing non-neighboring tiles is not supported by the design of the temporal MCTSs SEI message, while the MCTS sub-bitstream extraction process specified in the semantics of the MCTS-EIS SEI message specifies the extraction of a sub-bitstream for one MCTS only. However, in virtual reality or 360-degree video applications, non-neighboring tiles may actually correspond to one region on the spherical surface, and it can be desirable to indicate the required decoding capability, e.g., level, of such a set of non-neighboring tiles and/or to enable extraction of a conforming bitstream for such a set of non-neighboring tiles.

8) The value of num_sets_in_message_minus1 of the temporal MCTSs SEI message is specified to be in the range of 0 to 255, inclusive, i.e., the number of MCTSs allowed to be signalled is at most 256. However, in virtual reality or 360-degree video applications, the possible number of combinations of tiles, each combination corresponding to one MCTS, including cases where a particular tile may be included in multiple MCTS, the maximum number 256 may not be sufficient.

9) For both the MCTS-EIS SEI message and the MCTS nesting SEI message, the value range of a few syntax elements is specified to be 0 to $2^{32}-2$, inclusive, including for the number of extraction information sets and the number of MCTSs associated with one extraction information set or the MCTS-nested SEI messages. This upper limit may, for some situations, be unreasonably high.

The techniques of this disclosure, which may be applied alone or in any combination, may overcome any or all of these issues.

The MCTS SEI message may include a syntax element indicating whether tiles of one or more corresponding pictures are included in separate MCTSs, such that there is a one-to-one correspondence between tiles and MCTSs. In one example, the syntax element is an each_tile_one_tile_set_flag. In some examples, a value of one for the each_tile_one_tile_set_flag indicates that the tiles of the one or more corresponding pictures are included in the separate MCTSs, and a value of zero for the each_tile_one_tile_set_flag indicates that two or more tiles of the one or more corresponding pictures may be included in a common MCTS (i.e., the restriction of each tile being in its own MCTS does not apply).

FIG. 1 is a block diagram illustrating an example video encoding and decoding system 10 that may utilize techniques for processing video data using motion-constrained tile sets (MCTSs). As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In the example of FIG. 1, sub-bitstream extraction unit 24 is provided along computer-readable medium 16. Sub-bitstream extraction unit 24 may form part of a device, such as a media-aware network element (MANE), router, or other device that is configured to extract sub-bitstreams from original bitstreams, e.g., in accordance with the techniques of this disclosure. Sub-bitstream extraction unit 24 includes memory 26, for temporarily storing received data of a bitstream and extracted data for a sub-bitstream. Sub-bitstream extraction unit 24 may send the extracted data for the sub-bitstream to destination device 14. Additionally or alternatively, input interface 28 may be configured to extract sub-bitstreams from original bitstreams, e.g., in accordance with the techniques of this disclosure. Video encoder 20 and/or output interface 22 may be configured to signal data for extracting sub-bitstreams in accordance with the techniques of this disclosure.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12, output interface 22, sub-bitstream extraction unit 24, input interface 28, and/or video decoder 30 may be configured to apply the techniques for processing video data using motion-constrained tile sets (MCTSs). In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for processing video data using motion-constrained tile sets (MCTSs) may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard, also referred to as ITU-T H.265. Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In general, according to ITU-T H.265, a video picture may be divided into a sequence of coding tree units (CTUs) (or largest coding units (LCUs)) that may include both luma and chroma samples. Alternatively, CTUs may include monochrome data (i.e., only luma samples). Syntax data within a bitstream may define a size for the CTU, which is a largest coding unit in terms of the number of pixels. A slice includes a number of consecutive CTUs in coding order. A video picture may be partitioned into one or more slices. Each CTU may be split into coding units (CUs) according to a quadtree. In general, a quadtree data structure includes one node per CU, with a root node corresponding to the CTU. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a CTU may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a CTU may be split, referred to as a maximum CU depth, and may also define a minimum size of the coding nodes. Accordingly, a bitstream may also define a smallest coding unit (SCU). This disclosure uses the term "block" to refer to any of a CU, prediction unit (PU), or transform unit (TU), in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and is generally square in shape. The size of the CU may range from 8×8 pixels up to the size of the CTU with a maximum size, e.g., 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs (or partitions of a CU) within a given CU defined for a partitioned CTU, although this may not always be the case. The TUs are typically the same size or smaller than the PUs (or partitions of a CU, e.g., in the case of intra prediction). In some examples, residual samples corresponding to a CU may be subdivided into smaller units using a quadtree structure known as a "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs) when predicted using inter-prediction. In general, a PU represents a spatial area corresponding to all or a portion of the corresponding CU, and may include data for retrieving and/or generating a reference sample for the PU. Moreover, a PU includes data related to prediction. When the CU is inter-mode encoded, one or more PUs of the CU may include data defining motion information, such as one or more motion vectors, or the PUs may be skip mode coded. Data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0 or List 1) for the motion vector.

Leaf-CUs may also be intra-mode predicted. In general, intra prediction involves predicting a leaf-CU (or partitions thereof) using an intra-mode. A video coder may select a set of neighboring, previously coded pixels to the leaf-CU to use to predict the leaf-CU (or partitions thereof).

A leaf-CU may also include one or more transform units (TUs). The transform units may be specified using an RQT (also referred to as a TU quadtree structure), as discussed above. For example, a split flag may indicate whether a leaf-CU is split into four transform units. Then, each TU may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, partitions of a CU, or the CU itself, may be collocated with a corresponding leaf-TU for the CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a CTU (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures, starting with a random access point (RAP) picture. A video sequence may include syntax data in a sequence parameter set (SPS) that characteristics of the video sequence. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, prediction may be performed for PUs of various sizes. Assuming that the size of a particular CU is 2N×2N, intra-prediction may be performed on PU sizes of 2N×2N or N×N, and inter-prediction may be performed on symmetric PU sizes of 2N×2N, 2N×N, N×2N, or N×N. Asymmetric partitioning for inter-prediction may also be performed for PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs to include quantized transform coefficients representative of the residual data for the CU. That is, video encoder 20 may calculate the residual data (in the form of a residual block), transform the residual block to produce a block of transform coefficients, and then quantize the transform coefficients to form quantized transform coefficients. Video encoder 20 may form a TU including the quantized transform coefficients, as well as other syntax information (e.g., splitting information for the TU).

As noted above, following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

In general, video decoder 30 performs a substantially similar, albeit reciprocal, process to that performed by video encoder 20 to decode encoded data. For example, video decoder 30 inverse quantizes and inverse transforms coefficients of a received TU to reproduce a residual block. Video decoder 30 uses a signaled prediction mode (intra- or inter-prediction) to form a predicted block. Then video decoder 30 combines the predicted block and the residual block (on a pixel-by-pixel basis) to reproduce the original block. Additional processing may be performed, such as performing a deblocking process to reduce visual artifacts along block boundaries. Furthermore, video decoder 30 may decode syntax elements using CABAC in a manner substantially similar to, albeit reciprocal to, the CABAC encoding process of video encoder 20.

In accordance with the techniques of this disclosure, source device 12 (e.g., video encoder 20 and/or output interface 22) may be configured to signal data and a sub-bitstream extraction unit, such as sub-bitstream extraction unit 24 and/or input interface 28 of destination device 14, may be configured to extract a sub-bitstream using the signaled data. In particular, these elements may implement any or all of the techniques of this disclosure to address the enumerated problems discussed above. The various techniques described below may be performed alone or in any combination.

1) A potential solution to the first problem discussed above is to impose a restriction that an MCTS-EIS SEI message shall not be present in an access unit unless there is a temporal MCTSs SEI message present in the access unit. Consequently, the set of associated pictures associatedPicSet of the temporal MCTS SEI message applies to the MCTS-EIS SEI message. And furthermore, the definition of associatedPicSet and the constraints on the presence of the MCTS-EIS SEI message and the presence of the temporal MCTSs SEI message in the semantics of the MCTS-EIS SEI message can be removed. In this manner, source device 12, sub-bitstream extraction unit 24, and destination device 14 may code an MCTS-EIS SEI message of an access unit only when the access unit includes a temporal MCTS SEI message.

2) Potential solutions to the second problem discussed above include the following:
   a. A potential solution to problem 2a above is as follows. When the value of each_tile_one_tile_set_flag of the associated temporal MCTS SEI message is equal to 0, the MCTS identifier of an MCTS of the current picture is specified as the value of the index of the MCTS, where the index is the variable i within the loop of the num_sets_in_message_minus1+1 sets of MCTS information specified by the associated MCTS SEI message. Thus, when the value of the each_tile_one_tile_set_flag syntax element is equal to zero, source device 12, sub-bitstream extraction unit 24, and destination device 14 may set an MCTS identifier of an MCTS of a current picture of the access unit equal to a value of an index of the MCTS.
   b. A potential solution to problem 2b above is to define the MCTS identifier for each MCTS as the tile position of the single tile in the MCTS in tile raster scan order when each_tile_one_tile_set_flag of the associated temporal MCTSs SEI message is equal to 1. Thus, when the value of the each_tile_one_tile_set_flag syntax element is equal to one, source device 12, sub-bitstream extraction unit 24, and destination device 14 may set MCTS identifiers for each MCTS equal to a tile position of a corresponding tile in the MCTS in tile raster scan order.

3) A potential solution to the third problem discussed above is to remove the condition "that have nuh_layer_id equal to 0" from the wording of the step in the MCTS sub-bitstream extraction process specified in the semantics of the MCTS-EIS SEI message that specifies the removal of all SEI NAL units that have nuh_layer_id equal to 0 and that contain non-MCTS-nested SEI messages, i.e., the step is changed to specify the removal of all SEI NAL units that contain non-MCTS-nested SEI messages. Thus, sub-bitstream extraction unit 24 and/or destination device 14 may, when extracting an MCTS sub-bitstream, omit all SEI NAL units that contain non-MCTS-nested SEI messages from inclusion in the extracted MCTS sub-bitstream, regardless of a value of a network abstraction layer (NAL) unit header layer identifier value for the non-MCTS-nested SEI messages.

4) A potential solution to the fourth problem discussed above is to impose a constraint that a slice segment that contains one or more tiles belonging to any particular MCTS mctsA shall not be a dependent slice segment of an independent slice segment that contains one or more tiles that do not belong to mctsA. This constraint should be specified as part of the semantics of either the temporal MCTSs SEI message or the MCTS-EIS SEI message. Thus, video encoder 20 and video decoder 30 may code all slice segments containing one or more tiles belonging to respective MCTSs of the video data such that the slice segments depend at most on slice segments within the same MCTS.

5) A potential solution to the fifth problem discussed above is to impose a constraint that an MCTS nesting SEI message shall not be present in an access unit unless there is an MCTS-EIS SEI message present in the access unit. Thus, source device 12, sub-bitstream extraction unit 24, and destination device 14 may code an MCTS nesting SEI message of an access unit only when the access unit includes an MCTS-EIS SEI message.
   a. Alternatively, a constraint may be imposed that an MCTS nesting SEI message shall not be present in the current access unit unless the current picture belongs to the associatedPicSet of an MCTS-EIS SEI message. Thus, when an access unit includes an MCTS-EIS SEI message, source device 12, sub-bitstream extraction unit 24, and destination device 14 may determine a set of associated pictures of the MCTS-EIS SEI message, determine whether a current picture of the access unit is included in the set of associated pictures, and code an MCTS nesting SEI message of the access unit only when the current picture is included in the set of associated pictures.

6) A potential solution to the sixth problem discussed above is to impose a constraint that an SEI NAL unit containing an MCTS nesting SEI message shall not contain any other SEI message that is not MCTS-nested in the MCTS-nesting SEI message. Thus, source device 12, sub-bitstream extraction unit 24, and destination device 14 may determine that an MCTS nesting SEI message does not contain any non-MCTS-nesting SEI messages in response to a parent SEI message containing the MCTS nesting SEI message (and thus, may avoid coding any non-MCTS-nesting SEI messages).

7) The following techniques may be used to solve the seventh problem discussed above:
   a. One technique is to change the MCTS-EIS SEI message as follows. In the MCTS sub-bitstream extraction process specified as part of the semantics, instead of extracting a sub-bitstream for one MCTS, a sub-bitstream is extracted for a set of one or more MCTSs. Consequently, the tier and level of the set of MCTSs would be signalled in the replacement SPSs for inclusion into the extracted sub-bitstream. For convenient access of the tier and level information, the tier and level for each set of MCTSs may also be additionally signalled in the MCTS-EIS SEI message when the set of MCTSs contains more than one MCTS. Thus, sub-bitstream extraction unit 24 and destination device 14 may extract an MCTS sub-bitstream from an original bitstream such that the MCTS sub-bitstream includes a set of two or more MCTSs. It should be noted that this solution may also solve the eighth problem discussed above.
      i. Each set of MCTSs for which a conforming bitstream can be extracted may correspond to one extraction information set indicated in the MCTS-EIS SEI message.
      ii. Alternatively, to keep the functionality for sharing of replacement VPSs, SPSs, and PPSs by multiple extractable data sets, the following syntax changes may be applied: within the loop of extraction information sets, add one more loop, such that there is a list of extractable sets of MCTSs signalled for each extraction information set, and for each extractable set of MCTSs, the list of the MCTS identifiers is signalled. The replacement VPSs, SPSs, and PPSs of one extraction information set applies to the extraction of a sub-bitstream for any particular extractable set of MCTSs.

b. Another solution is to define a new SEI message to allow for grouping of non-neighboring tiles into one MCTS, as long as the set of tiles can be merged into one rectangular region of samples. Thus, source device 12, sub-bitstream extraction unit 24, and destination device 14 may code an SEI message of an original bitstream including information representative of non-neighboring tiles that can be grouped into a common motion constrained tile sets (MCTS), and code a list of tile indexes for the non-neighboring tiles that can be grouped into the common MCTS. An example of such a new SEI message is the same as the temporal MCTS SEI message except in the following aspects:
  i. A different SEI payload type is used.
  ii. For indicating the set of tiles in an MCTS, instead of using the two syntax elements top_left_tile_index[i][j] and bottom_right_tile_index[i][j] that identify the tile position of the top-left tile and the tile position of the bottom-right tile in a rectangular region of the i-th identified temporal motion-constrained tile set, respectively, in tile raster scan order, a list of tile indexes is used.

8) A potential solution to the eighth problem discussed above is to change the signaling of the maximum number of allowed MCTSs to be a greater value, e.g., 1024, 2048, or 4096. Thus, source device 12, sub-bitstream extraction unit 24, and destination device 14 may code a value for a syntax element of the MCTS SEI message, where the syntax element represents a number of MCTSs signaled in the temporal MCTS SEI message, and the value of the syntax element indicates that the number of MCTSs is greater than 256.

9) A potential solution to the ninth problem discussed above is to change the upper limit to a more reasonable, practical value such as 255, 511, 1023, 2047 or 4095. As one example and as will be explained in greater detail below, instead of the value of the syntax element num_extraction_info_sets_minus1 being in the range of 0 to $2^{32}-2$, inclusive, the value may be in the range of 0 to 2047, inclusive.

Below are some example combinations of the above-described techniques. This list of proposed combinations is not intended to be exhaustive, as any other combination may be implemented as well.

1) Techniques 1, 2a, 2b, 3, 4, 5, and 6
2) Techniques 1, 2a, 2b, 3, 4, 5, 6, 8
3) Techniques 1, 2a, 2b, 3, 4, 5, 6, and 7a
4) Techniques 1, 2a, 2b, 3, 4, 5, 6, 7a, and 8
5) Techniques 1, 2a, 2b, 3, 4, 5a, and 6
6) Techniques 1, 2a, 2b, 3, 4, 5a, 6, and 7a
7) Techniques 1, 2a, 2b, 3, and 4
8) Techniques 2a, 2b, 3, and 4
9) Techniques 2a, 2b, 5 and 6
10) Technique 1 only
11) Technique 2a only
12) Technique 2b only
13) Techniques 2a and 2b
14) Technique 3 only
15) Technique 4 only
16) Technique 5 only
17) Technique 5a only
18) Technique 6 only
19) Technique 7b only
20) Technique 8 only
21) Techniques 7b and 8, with the temporal MCTS SEI message in technique 8 being replaced with the new SEI message in technique 7b.
22) Techniques 1, 2a, 2b, 3, 4, 5, and 7b, with the temporal MCTS SEI message in the techniques other than technique 7b being replaced with the new SEI message in technique 7b.
23) Techniques 1, 2a, 2b, 3, 4, 5, 7b, and 8, with the temporal MCTS SEI message in the techniques other than technique 7b being replaced with the new SEI message in technique 7b.
24) Each of the above techniques plus technique 9.

Video encoder 20 may further send syntax data, such as block-based syntax data, picture-based syntax data, and sequence-based syntax data, to video decoder 30, e.g., in a picture header, a block header, a slice header, or other syntax data, such as a sequence parameter set (SPS), picture parameter set (PPS), or video parameter set (VPS).

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

Figure 2:
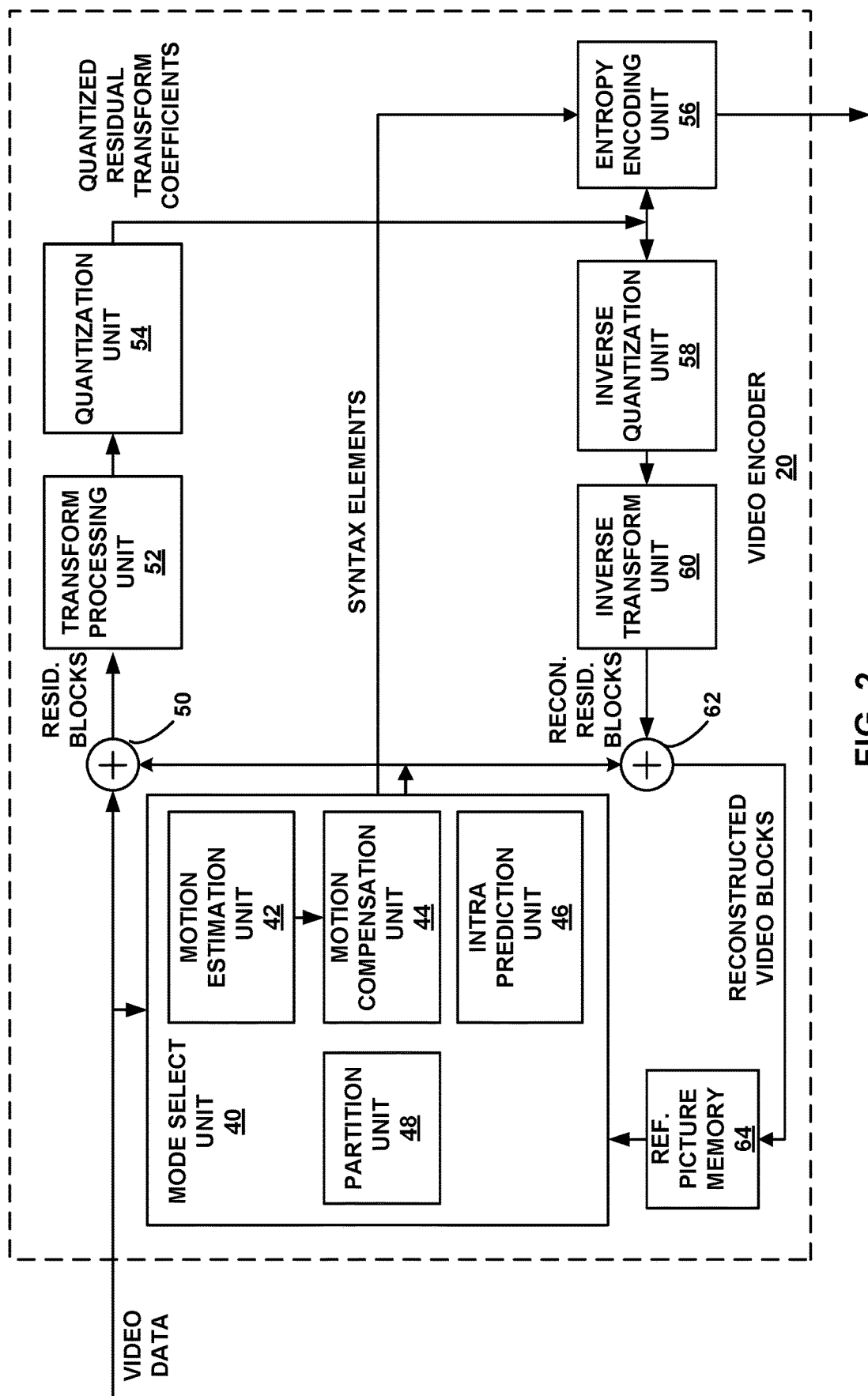
FIG. 2 is a block diagram illustrating an example of a video encoder that may implement techniques for processing video data using motion-constrained tile sets (MCTSs).

FIG. 2 is a block diagram illustrating an example of video encoder 20 that may implement techniques for processing video data using motion-constrained tile sets (MCTSs). Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes mode select unit 40, reference picture memory 64 (which may also be referred to as a decoded picture buffer (DPB)), summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive encoding of the received video block relative to one or more blocks in one or more reference frames to provide temporal prediction. Intra-prediction unit 46 may alternatively perform intra-predictive encoding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into CTUs, and partition each of the CTUs into sub-CUs based on rate-distortion analysis (e.g., rate-distortion optimization). Mode select unit 40 may further produce a quadtree data structure indicative of partitioning of a CTU into sub-CUs. Leaf-node CUs of the quadtree may include one or more PUs and one or more TUs.

Mode select unit 40 may select one of the prediction modes, intra or inter, e.g., based on error results, and provides the resulting predicted block to summer 50 to generate residual data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising transform coefficient values. Wavelet transforms, integer transforms, sub-band transforms, discrete sine transforms (DSTs), or other types of transforms could be used instead of a DCT. In any case, transform processing unit 52 applies the transform to the residual block, producing a block of transform coefficients. The transform may convert the residual information from a pixel domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain. In particular, summer 62 adds the reconstructed residual block to the motion compensated prediction block earlier produced by motion compensation unit 44 or intra-prediction unit 46 to produce a reconstructed video block for storage in reference picture memory 64. The reconstructed video block may be used by motion estimation unit 42 and motion compensation unit 44 as a reference block to inter-code a block in a subsequent video frame.

Figure 3:
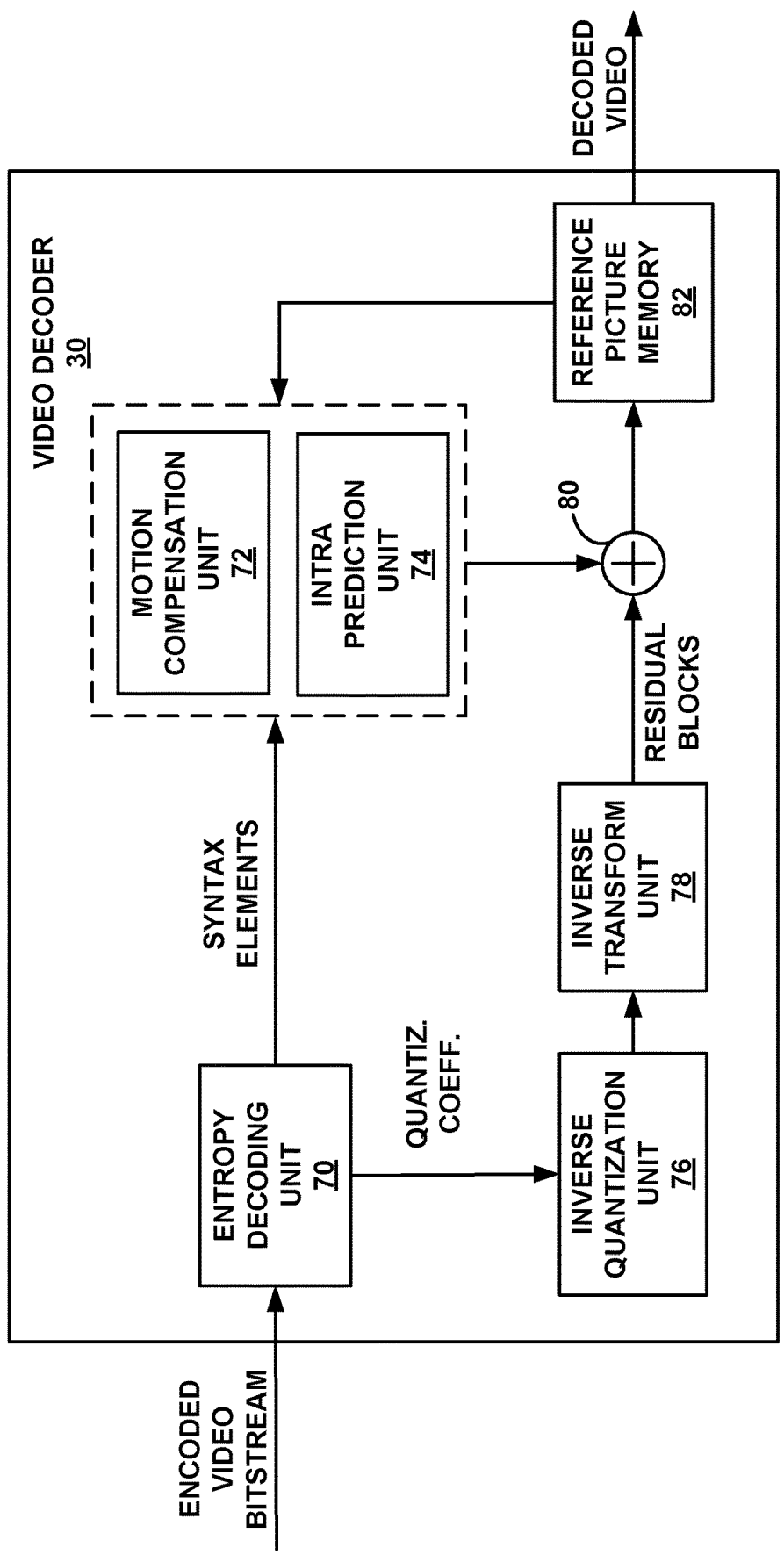
FIG. 3 is a block diagram illustrating an example of a video decoder that may implement techniques for processing video data using motion-constrained tile sets (MCTSs).

FIG. 3 is a block diagram illustrating an example of video decoder 30 that may implement techniques for processing video data using motion-constrained tile sets (MCTSs). In the example of FIG. 3, video decoder 30 includes an entropy decoding unit 70, motion compensation unit 72, intra prediction unit 74, inverse quantization unit 76, inverse transformation unit 78, reference picture memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (i.e., B or P) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference picture memory 82. Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., de-quantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1.

Figure 4:
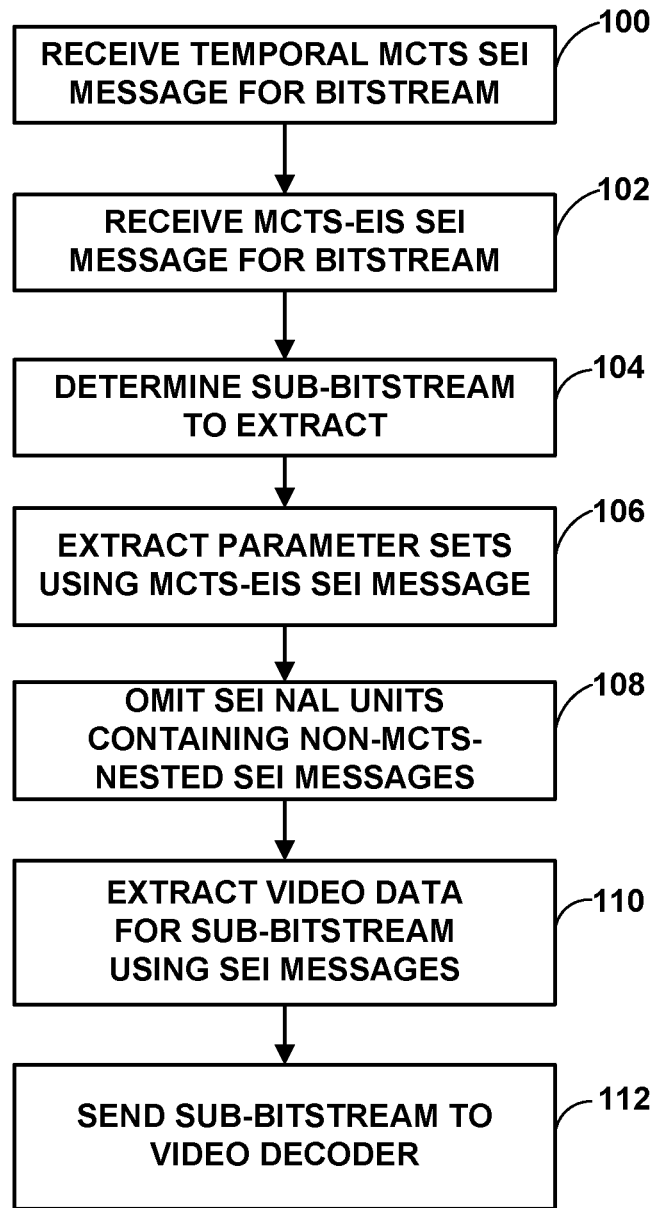
FIG. 4 is a flowchart illustrating an example method for extracting a sub-bitstream according to the techniques of this disclosure.

FIG. 4 is a flowchart illustrating an example method for extracting a sub-bitstream according to the techniques of this disclosure. The method of FIG. 4 is explained as being performed by sub-bitstream extraction unit 24 of FIG. 1. However, it should be understood that other units or devices may be configured to perform the method of FIG. 4. For example, destination device 14 or video decoder 30 may be configured to perform the method of FIG. 4.

Initially, sub-bitstream extraction unit 24 receives a temporal MCTS SEI message for a bitstream (100). In particular, sub-bitstream extraction unit 24 may receive the MCTS SEI message in an access unit of the bitstream. In this example, sub-bitstream extraction unit 24 also receives an MCTS-EIS SEI message for the bitstream (102). In accordance with some examples of the techniques of this disclosure, sub-bitstream extraction unit 24 decodes an MCTS-EIS SEI message of an access unit only when the access unit includes a temporal MCTS SEI message.

Sub-bitstream extraction unit 24 then determines a sub-bitstream to extract from the bitstream (104). For example, sub-bitstream extraction unit 24 may receive a request from destination device 14 for one or more particular MCTSs. Sub-bitstream extraction unit 24 determines parameter sets (e.g., video, sequence, and/or picture parameter sets) to be extracted for the one or more MCTSs to be extracted. That is, the MCTS-EIS SEI message may include identifiers of parameter sets corresponding to each MCTS. Accordingly, sub-bitstream extraction unit 24 extracts the parameter sets for the MCTSs to be extracted using the MCTS-EIS SEI message (106).

In some examples, in response to determining to extract the sub-bitstream using the MCTS-EIS SEI message, sub-bitstream extraction unit 24 omits all SEI NAL units that contain non-MCTS-nested SEI messages from inclusion in the extracted sub-bitstream, regardless of a value of a network abstraction layer (NAL) unit header layer identifier value for the non-MCTS-nested SEI messages (108). That is, sub-bitstream extraction unit 24 may extract other SEI NAL units (e.g., those including only MCTS-nested SEI messages, e.g., SEI messages containing an MCTS nesting SEI message) and include these extracted SEI NAL units in the extracted bitstream.

In some examples, after decoding an SEI NAL unit containing an MCTS nesting SEI message, sub-bitstream extraction unit 24 is configured to determine that the MCTS nesting SEI message does not contain any non-MCTS-nesting SEI messages. That is, sub-bitstream extraction unit 24 may determine, based on a restriction imposed on the original bitstream, that any SEI NAL unit containing an MCTS nesting SEI message only contains MCTS-nesting SEI messages, and does not contain any non-MCTS-nesting SEI messages. Accordingly, in response to decoding the MCTS nesting SEI message, sub-bitstream extraction unit 24 may decode subsequent SEI messages of the SEI NAL unit as MCTS nesting SEI messages in response to the determination.

Sub-bitstream extraction unit 24 may also determine a set of pictures including MCTSs associated with the MCTS-EIS SEI message using, e.g., an associatedPicSet syntax element of the temporal MCTS SEI message. In particular, sub-bitstream extraction unit 24 may avoid decoding an associatedPicSet syntax element of the MCTS-EIS SEI message, and only decode the associatedPicSet syntax element of the temporal MCTS SEI message.

Sub-bitstream extraction unit 24 then extracts video data for the sub-bitstream using the SEI messages (110) from the associated pictures. For example, sub-bitstream extraction unit 24 may extract data for one or more slices or tiles of the associated pictures in the original bitstream corresponding to the MCTSs, to be sent to destination device 14. In some examples, sub-bitstream extraction unit 24 may determine that slice segments of the sub-bitstream containing one or more tiles belonging to respective MCTSs depend at most on slice segments within the same MCTS. In this manner, sub-bitstream extraction unit 24 need not extract any MCTS data except the determined MCTSs to be presented. In this manner, sub-bitstream extraction unit 24 may extract a subset of available MCTSs from the access unit using the MCTS-EIS SEI message. Sub-bitstream extraction unit 24 then sends the extracted sub-bitstream to destination device 14 and video decoder 30 thereof (112).

In this manner, the method of FIG. 4 represents an example of a method including determining whether an access unit of the video data includes a temporal motion constrained tile sets (MCTS) supplemental enhancement information (SEI) message; and decoding an MCTS extraction information set (MCTS-EIS) SEI message of the access unit only when the access unit includes the temporal MCTS SEI message.

Additionally, the method of FIG. 4 represents an example of a method including determining to extract a motion constrained tile sets (MCTS) sub-bitstream from an original bitstream based at least in part on information of an MCTS extraction information set (MCTS-EIS) supplemental enhancement information (SEI) message; and in response to determining to extract the MCTS sub-bitstream, omitting all SEI network abstraction layer (NAL) units that contain non-MCTS-nested SEI messages from inclusion in the extracted MCTS sub-bitstream, regardless of a value of a NAL unit header layer identifier value for the non-MCTS-nested SEI messages.

Moreover, the method of FIG. 4 represents an example of a method including decoding a supplemental enhancement information (SEI) network abstraction layer (NAL) unit of a video bitstream, the SEI NAL unit containing a motion constrained tile sets (MCTS) nesting SEI message, determining that the SEI NAL unit does not contain any non-MCTS-nesting SEI messages in response to the SEI NAL unit containing the MCTS nesting SEI message, and decoding subsequent SEI messages of the SEI NAL unit as MCTS nesting SEI messages in response to the determination.

Figure 5:
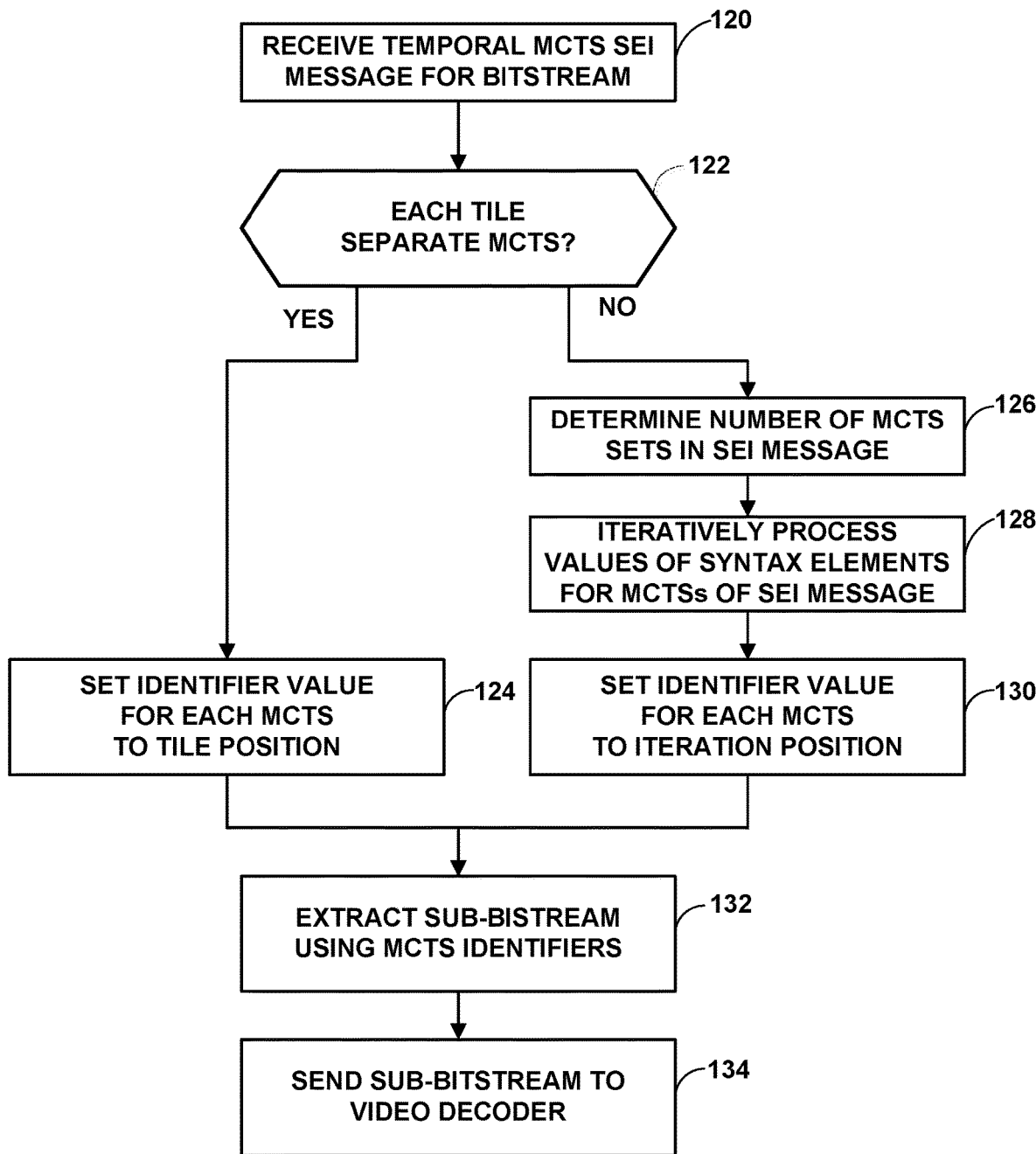
FIG. 5 is a flowchart illustrating another example method for extracting a sub-bitstream according to the techniques of this disclosure.

FIG. 5 is a flowchart illustrating another example method for extracting a sub-bitstream according to the techniques of this disclosure. FIG. 5 is shown as a separate method from FIG. 4 for clarity, although it should be understood that in some examples, the methods of FIGS. 4 and 5 may be performed together. For example, parts of the method of FIG. 5 may generally correspond to step 110 of FIG. 4. Likewise, the method of FIG. 5 is also explained as being performed by sub-bitstream extraction unit 24 of FIG. 1. However, it should be understood that other units or devices may be configured to perform the method of FIG. 5. For example, destination device 14 or video decoder 30 may be configured to perform the method of FIG. 5.

In this example, sub-bitstream extraction unit 24 initially receives a temporal MCTS SEI message for a bitstream (120). Sub-bitstream extraction unit 24 also determines to extract a sub-bitstream, and determines whether each tile of pictures in the original bitstream is its own, separate MCTS (122). For example, sub-bitstream extraction unit 24 may determine a value of an each_tile_one_tile_set_flag syntax element of the temporal MCTS SEI message to determine whether each tile corresponds to a separate tile set.

If each tile does correspond to a separate tile set ("YES" branch of 122), sub-bitstream extraction unit 24 may set identifier values for each MCTS to tile positions of tiles in one or more corresponding pictures (124), e.g., in raster scan order. Thus, in some examples, when each_tile_one_tile_set_flag of the associated temporal MCTSs SEI message is equal to 1, sub-bitstream extraction unit 24 may set MCTS identifiers for each MCTS equal to a tile position of a corresponding tile in the MCTS in tile raster scan order.

On the other hand, if each tile does not correspond to a separate tile set ("NO" branch of 124), e.g., if a tile set may include two or more tiles, sub-bitstream extraction unit 24 may determine a number of MCTS sets in the temporal MCTS SEI message (126). The number of MCTS sets may be indicated by the value of the num_sets_in_message_minus1 syntax element of the temporal MCTS SEI message. As shown in the example of Table 1 above, the temporal MCTS SEI message may include a loop over the number of MCTS sets in the temporal MCTS SEI message, the loop including one iteration per set signaling values for various syntax elements for each MCTS set. Such parameters may include, for example, mcts_id[i]. In accordance with the techniques of this disclosure, sub-bitstream extraction unit 24 iteratively process values of syntax elements for MCTSs of the temporal MCTS SEI message as shown in, e.g., Table 1 (128). Furthermore, sub-bitstream extraction unit 24 may set an identifier value (e.g., mcts_id[i]) for each MCS equal to the iteration position (130), e.g., "i" in the for loop that iterates over the MCTSs as shown in Table 1.

In either case, sub-bitstream extraction unit 24 may then extract a sub-bitstream using the MCTS identifiers (132) and send the sub-bitstream to video decoder 30 (FIG. 1) (134).

In this manner, the method of FIG. 5 represents an example of a method including determining a value of a syntax element of a temporal motion constrained tile sets (MCTS) supplemental enhancement information (SEI) message of an access unit, wherein the value of the syntax element represents whether all tiles of one or more corresponding pictures are included in separate MCTSs; and when the value of the syntax element indicates that each tile of the corresponding pictures is not included in the separate MCTS, setting an MCTS identifier of the MCTS of a current picture of the access unit equal to a value of an index of the MCTS, the current picture being one of the corresponding pictures.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    decoding, by one or more processors implemented in circuitry of a device, a received supplemental enhancement information (SEI) network abstraction layer (NAL) unit of a video bitstream, the SEI NAL unit, as received by the device, containing a motion constrained tile sets (MCTS) nesting SEI message, the video bitstream conforming to a video coding standard, the video coding standard imposing a restriction on the video bitstream that the video bitstream as received by the device will not contain any non-MCTS-nesting SEI messages when the video bitstream as received by the device contains a respective MCTS nesting SEI message;

determining, by the one or more processors and based on the restriction imposed on the video bitstream by the video coding standard, that the SEI NAL unit, as received by the device, does not contain any non-MCTS-nesting SEI messages in response to the SEI NAL unit containing the MCTS nesting SEI message; and decoding, by the one or more processors, subsequent SEI messages of the received SEI NAL unit as MCTS nesting SEI messages in response to the determination.

2. The method of claim 1, wherein decoding the SEI NAL unit comprises decoding values for one or more syntax elements of the MCTS nesting SEI message using an upper limit of 511 for the values.

3. The method of claim 2, wherein the one or more syntax elements include a syntax element representing a number of MCTS extraction information sets (MCTS-EIS) messages included in the SEI NAL unit.

4. The method of claim 2, wherein the one or more syntax elements include a syntax element representing a number of MCTSs associated with one MCTS extraction information set corresponding to the SEI NAL unit.

5. The method of claim 2, wherein the one or more syntax elements include a syntax element representing a number of MCTSs associated with the MCTS nesting SEI message.

6. The method of claim 1, the video bitstream comprising an original bitstream, the method further comprising:
   decoding a motion constrained tile sets (MCTS) extraction information set (MCTS-EIS) supplemental enhancement information (SEI) message of the original bitstream; and
   extracting an MCTS sub-bitstream from the original bitstream, the MCTS sub-bitstream including a set of two or more MCTSs.

7. The method of claim 6, further comprising signaling the tier and level information of the set of two or more MCTSs in a replacement MCTS-EIS SEI message of the extracted MCTS sub-bitstream.

8. The method of claim 6, wherein decoding the MCTS-EIS SEI message comprises decoding an extraction information set of the MCTS-EIS SEI message, the method further comprising determining the set of two or more MCTSs from the extraction information set of the MCTS-EIS SEI message.

9. The method of claim 6, wherein decoding the MCTS-EIS SEI message comprises decoding a list of extractable sets of MCTSs as a nested loop within a loop of extraction information sets of the MCTS-EIS SEI message.

10. The method of claim 6, further comprising signaling tier and level information of the set of two or more MCTSs in replacement sequence parameter sets (SPSs) of the extracted MCTS sub-bitstream.

11. A device for decoding video data, the device comprising:
   a memory configured to store video data; and
   one or more processors implemented in circuitry and configured to:
      decode a received supplemental enhancement information (SEI) network abstraction layer (NAL) unit of a video bitstream including the video data, the SEI NAL unit, as received by the device, containing a motion constrained tile sets (MCTS) nesting SEI message, the video bitstream conforming to a video coding standard, the video coding standard imposing a restriction on the video bitstream that the video bitstream as received by the device will not contain any non-MCTS-nesting SEI messages when the video bitstream as received by the device contains a respective MCTS nesting SEI message;
      determine, based on the restriction imposed on the video bitstream by the video coding standard, that the SEI NAL unit, as received by the device, does not contain any non-MCTS-nesting SEI messages in response to the SEI NAL unit containing the MCTS nesting SEI message; and
      decode subsequent SEI messages of the received SEI NAL unit as MCTS nesting SEI messages in response to the determination.

12. The device of claim 11, wherein to decode the SEI NAL unit, the one or more processors are configured to decode values for one or more syntax elements of the MCTS nesting SEI message using an upper limit of 511 for the values.

13. The device of claim 12, wherein the one or more syntax elements include a syntax element representing a number of MCTS extraction information sets (MCTS-EIS) messages included in the SEI NAL unit.

14. The device of claim 12, wherein the one or more syntax elements include a syntax element representing a number of MCTSs associated with one MCTS extraction information set corresponding to the SEI NAL unit.

15. The device of claim 12, wherein the one or more syntax elements include a syntax element representing a number of MCTSs associated with the MCTS nesting SEI message.

16. The device of claim 11, the video bitstream comprising an original bitstream, wherein the one or more processors are further configured to:
   decode a motion constrained tile sets (MCTS) extraction information set (MCTS-EIS) supplemental enhancement information (SEI) message of the original bitstream; and
   extract an MCTS sub-bitstream from the original bitstream, the MCTS sub-bitstream including a set of two or more MCTSs.

17. The device of claim 16, wherein the one or more processors are further configured to signal the tier and level information of the set of two or more MCTSs in a replacement MCTS-EIS SEI message of the extracted MCTS sub-bitstream.

18. The device of claim 16, wherein to decode the MCTS-EIS SEI message, the one or more processors are configured to decode an extraction information set of the MCTS-EIS SEI message, and wherein the one or more processors are further configured to determine the set of two or more MCTSs from the extraction information set of the MCTS-EIS SEI message.

19. The device of claim 16, wherein to decode the MCTS-EIS SEI message, the one or more processors are configured to decode a list of extractable sets of MCTSs as a nested loop within a loop of extraction information sets of the MCTS-EIS SEI message.

20. The device of claim 16, wherein the one or more processors are further configured to signal tier and level information of the set of two or more MCTSs in replacement sequence parameter sets (SPSs) of the extracted MCTS sub-bitstream.

21. The device of claim 11, further comprising a display configured to display the video data.

22. The device of claim 11, wherein the device comprises one or more of a camera, a computer, a mobile device, a broadcast receiver device, or a set-top box.

23. A device for decoding video data, the device comprising:
- means for decoding a received supplemental enhancement information (SEI) network abstraction layer (NAL) unit of a video bitstream, the SEI NAL unit, as received by the device, containing a motion constrained tile sets (MCTS) nesting SEI message, the video bitstream conforming to a video coding standard, the video coding standard imposing a restriction on the video bitstream that the video bitstream as received by the device will not contain any non-MCTS-nesting SEI messages when the video bitstream as received by the device contains a respective MCTS nesting SEI message;
- means for determining, based on the restriction imposed on the video bitstream by the video coding standard, that the SEI NAL unit, as received by the device, does not contain any non-MCTS-nesting SEI messages in response to the SEI NAL unit containing the MCTS nesting SEI message; and
- means for decoding subsequent SEI messages of the received SEI NAL unit as MCTS nesting SEI messages in response to the determination.

24. The device of claim 23, wherein the means for decoding the SEI NAL unit comprises means for decoding values for one or more syntax elements of the MCTS nesting SEI message using an upper limit of 511 for the values.

25. The device of claim 24, wherein the one or more syntax elements include a syntax element representing a number of MCTS extraction information sets (MCTS-EIS) messages included in the SEI NAL unit.

26. The device of claim 24, wherein the one or more syntax elements include a syntax element representing a number of MCTSs associated with one MCTS extraction information set corresponding to the SEI NAL unit.

27. The device of claim 24, wherein the one or more syntax elements include a syntax element representing a number of MCTSs associated with the MCTS nesting SEI message.

28. The device of claim 23, the video bitstream comprising an original bitstream, further comprising:
- means for decoding a motion constrained tile sets (MCTS) extraction information set (MCTS-EIS) supplemental enhancement information (SEI) message of the original bitstream; and
- means for extracting an MCTS sub-bitstream from the original bitstream, the MCTS sub-bitstream including a set of two or more MCTSs.

29. The device of claim 28, further comprising means for signaling the tier and level information of the set of two or more MCTSs in a replacement MCTS-EIS SEI message of the extracted MCTS sub-bitstream.

30. The device of claim 28, wherein the means for decoding the MCTS-EIS SEI message comprises means for decoding an extraction information set of the MCTS-EIS SEI message, further comprising means for determining the set of two or more MCTSs from the extraction information set of the MCTS-EIS SEI message.

31. The device of claim 28, wherein the means for decoding the MCTS-EIS SEI message comprises means for decoding a list of extractable sets of MCTSs as a nested loop within a loop of extraction information sets of the MCTS-EIS SEI message.

32. The device of claim 28, further comprising means for signaling tier and level information of the set of two or more MCTSs in replacement sequence parameter sets (SPSs) of the extracted MCTS sub-bitstream.

33. A non-transitory computer-readable storage medium having stored thereon instructions that, when executed, cause a processor of a device to:
- decode a received supplemental enhancement information (SEI) network abstraction layer (NAL) unit of a video bitstream, the SEI NAL unit, as received by the device, containing a motion constrained tile sets (MCTS) nesting SEI message, the video bitstream conforming to a video coding standard, the video coding standard imposing a restriction on the video bitstream that the video bitstream as received by the device will not contain any non-MCTS-nesting SEI messages when the video bitstream as received by the device contains a respective MCTS nesting SEI message;
- determine, based on the restriction imposed on the video bitstream by the video coding standard, that the SEI NAL unit, as received by the device, does not contain any non-MCTS-nesting SEI messages in response to the SEI NAL unit containing the MCTS nesting SEI message; and
- decode subsequent SEI messages of the received SEI NAL unit as MCTS nesting SEI messages in response to the determination.

34. The non-transitory computer-readable storage medium of claim 33, wherein the instructions that cause the processor to decode the SEI NAL unit comprise instructions that cause the processor to decode values for one or more syntax elements of the MCTS nesting SEI message using an upper limit of 511 for the values.

35. The non-transitory computer-readable storage medium of claim 34, wherein the one or more syntax elements include a syntax element representing a number of MCTS extraction information sets (MCTS-EIS) messages included in the SEI NAL unit.

36. The non-transitory computer-readable storage medium of claim 34, wherein the one or more syntax elements include a syntax element representing a number of MCTSs associated with one MCTS extraction information set corresponding to the SEI NAL unit.

37. The non-transitory computer-readable storage medium of claim 34, wherein the one or more syntax elements include a syntax element representing a number of MCTSs associated with the MCTS nesting SEI message.

38. The non-transitory computer-readable storage medium of claim 33, the video bitstream comprising an original bitstream, further comprising instructions that cause the processor to:
- decode a motion constrained tile sets (MCTS) extraction information set (MCTS-EIS) supplemental enhancement information (SEI) message of the original bitstream; and
- extract an MCTS sub-bitstream from the original bitstream, the MCTS sub-bitstream including a set of two or more MCTSs.

39. The non-transitory computer-readable storage medium of claim 38, further comprising instructions that cause the processor to signal the tier and level information of the set of two or more MCTSs in a replacement MCTS-EIS SEI message of the extracted MCTS sub-bitstream.

40. The non-transitory computer-readable storage medium of claim 38, wherein the instructions that cause the processor to decode the MCTS-EIS SEI message comprise instructions that cause the processor to decode an extraction information set of the MCTS-EIS SEI message, further comprising instructions that cause the processor to determine the set of two or more MCTSs from the extraction information set of the MCTS-EIS SEI message.

41. The non-transitory computer-readable storage medium of claim 38, wherein the instructions that cause the processor to decode the MCTS-EIS SEI message comprise instructions that cause the processor to decode a list of extractable sets of MCTSs as a nested loop within a loop of extraction information sets of the MCTS-EIS SEI message.

42. The non-transitory computer-readable storage medium of claim 38, further comprising instructions that cause the processor to signal tier and level information of the set of two or more MCTSs in replacement sequence parameter sets (SPSs) of the extracted MCTS sub-bitstream.

* * * * *